United States Patent
Regula et al.

(10) Patent No.: US 11,310,213 B2
(45) Date of Patent: Apr. 19, 2022

(54) DIRECTORY SERVICE USER SYNCHRONIZATION

(71) Applicant: AirWatch LLC, Atlanta, GA (US)

(72) Inventors: Kalyan Regula, Alpharetta, GA (US); Shravan Shantharam, Cumming, GA (US); Nishita Manjunath, Atlanta, GA (US); Varun Murthy, Atlanta, GA (US); Jason Roszak, Brookhaven, GA (US)

(73) Assignee: AirWatch LLC, Atlanta, GA (US)

( * ) Notice: Subject to any disclaimer, the term of this patent is extended or adjusted under 35 U.S.C. 154(b) by 742 days.

(21) Appl. No.: 15/057,490

(22) Filed: Mar. 1, 2016

(65) Prior Publication Data

US 2017/0078261 A1    Mar. 16, 2017

Related U.S. Application Data

(60) Provisional application No. 62/217,747, filed on Sep. 11, 2015.

(51) Int. Cl.
| | |
|---|---|
| *H04L 29/06* | (2006.01) |
| *H04L 29/08* | (2006.01) |
| *H04L 67/306* | (2022.01) |
| *H04L 67/1042* | (2022.01) |

(52) U.S. Cl.
CPC ............ *H04L 63/08* (2013.01); *H04L 63/102* (2013.01); *H04L 67/1044* (2013.01); *H04L 67/306* (2013.01)

(58) Field of Classification Search
CPC ... H04L 63/08–0892; H04L 63/10–108; H04L 67/1044; H04L 67/30–306
See application file for complete search history.

(56) References Cited

U.S. PATENT DOCUMENTS

| | | | |
|---|---|---|---|
| 7,350,229 B1* | 3/2008 | Lander | H04L 63/0815 709/225 |
| 8,468,211 B2* | 6/2013 | Miller | G06Q 10/109 707/613 |
| 8,700,569 B1* | 4/2014 | Wilson | G06F 17/303 707/626 |
| 9,241,003 B2* | 1/2016 | Novack | H04L 63/08 |
| 2002/0065919 A1* | 5/2002 | Taylor | G06F 17/30575 709/226 |
| 2003/0149646 A1* | 8/2003 | Chen | G06Q 40/00 705/35 |
| 2003/0152067 A1* | 8/2003 | Richmond | H04L 63/0218 370/352 |

(Continued)

*Primary Examiner* — Madhuri R Herzog
(74) *Attorney, Agent, or Firm* — Thomas | Horstemeyer LLP

(57) ABSTRACT

Disclosed are various examples for enrolling a client device and synchronizing user attributes for the client device across multiple directory services. A search request for user attributes can be sent to a first directory service with an identifier for a user account. The first directory service can query for the identifier and send back user attributes. If a global identifier is included in the attributes, another search request for user attributes can be sent to a second directory service with the global identifier. The second directory service can query for the global identifier and send back user attributes.

20 Claims, 4 Drawing Sheets

(56) References Cited

U.S. PATENT DOCUMENTS

2007/0266439 A1\* 11/2007 Kraft ................... H04L 63/083
 726/26
2010/0125551 A1\* 5/2010 Bacila ................... G06Q 40/06
 707/636
2011/0071852 A1\* 3/2011 Sirleaf ................... G06Q 10/00
 705/3

\* cited by examiner

DIRECTORY SERVICE USER SYNCHRONIZATION

CROSS REFERENCE TO RELATED APPLICATIONS

This application claims priority to United States Provisional patent application entitled "DIRECTORY SERVICE USER SYNCHRONIZATION" assigned application No. 62/217,747 and filed on Sep. 11, 2015, which is incorporated herein by reference in its entirety.

BACKGROUND

Electronic directory services store, organize, and provide access to information in a hierarchical manner by mapping names to values. Directory services might be narrow in scope, supporting only a small set of node types and data types, or might be broad enough to support an arbitrary or extensible set of types. For example, directory services such as Microsoft's Active Directory® (AD), Microsoft's Azure Active Directory® (AAD), Novell's Netware Directory Services® (NDS), or NetIQ's eDirectory® can support managing nodes, such as users, computers, printers, or other shared resources, that represent resources that can be managed by an operating system. These directory services can store information about these resources (e.g. user names, computer names, group memberships of users or computers, and other information) and enforce policies for these resources (e.g. specifying user password strengths, limiting user access to particular files or computers, as well as other policies).

Directory services can be configured to use a management service, such as an enterprise mobility management (EMM) system or a mobile device management (MDM) framework. Some directory services can expose or otherwise provide an EMM or MDM application programming interface (API). The API can expose specific functions of the directory service that allow a remote application or remote computing device to manage various settings of a client device of a user. A remote application can receive an indication when a client device joins a network from a directory service allowing an EMM system to initialize and configure the EMM system with respect to the client device.

The configuration of the client device can depend on data stored in the directory service about a user account associated with the client device. When more than one directory service is utilized concurrently, the management service might require data to be stored in multiple directory services to properly configure the user account. However, the indication received by the management service when a client device joins the network might omit identifying information for the client device and user account that is shared among the directory services. Because of the omission, after receiving the indication that a client device has joined the network, the management service might be unable to query a single directory service for data necessary to configure the user account. Further, some client devices require that a specific directory service be used to enable all features provided by an operating system or the directory service. For example, MICROSOFT WINDOWS 10 devices require MICROSOFT AZURE ACTIVE DIRECTORY® (AAD) be used to support all features provided by the operating system and the directory service. Consequently, there can be a need to leverage multiple directory services to configure user accounts while satisfying system requirements.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
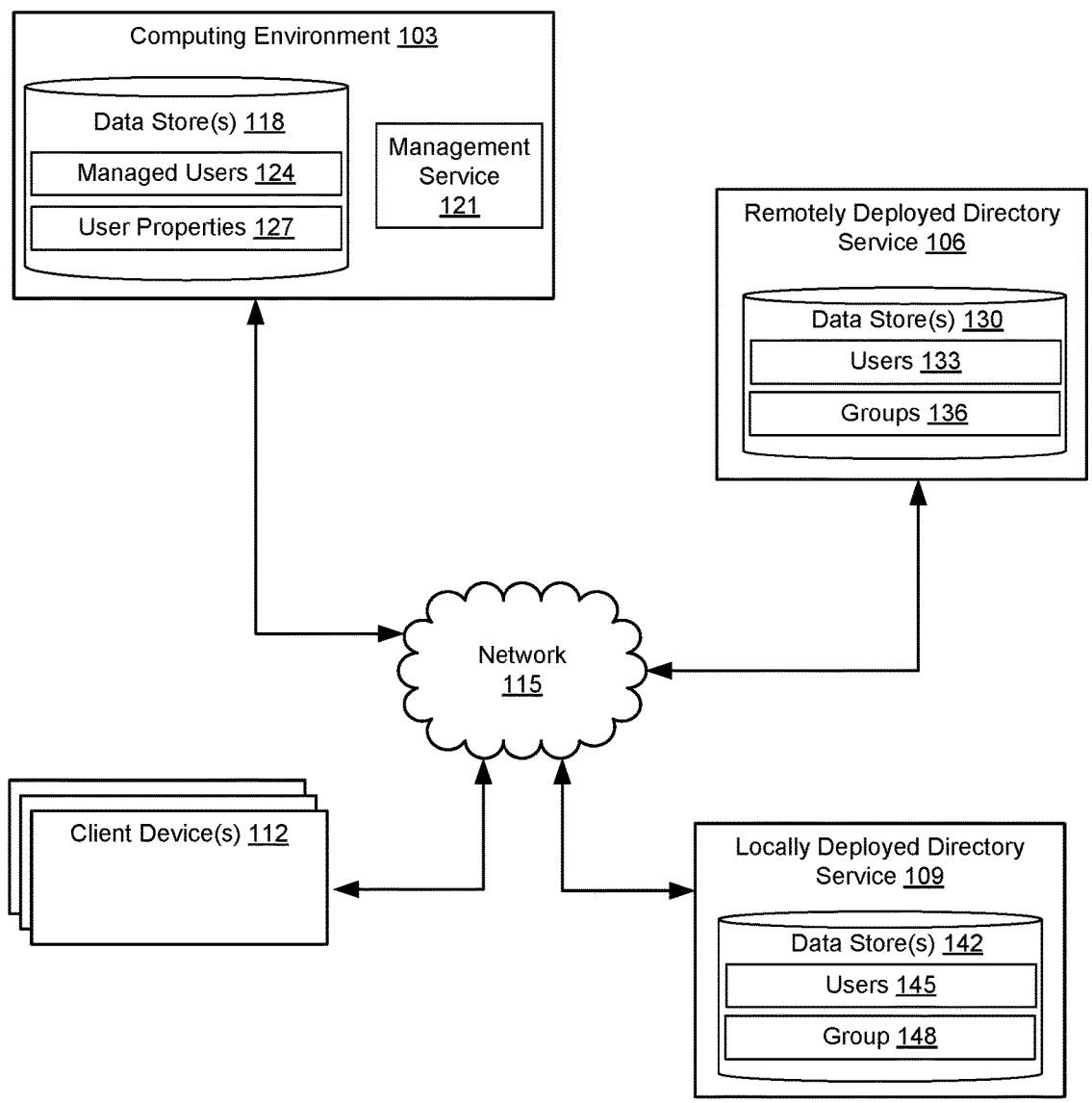
FIG. 1 is a drawing of a networked environment according to various examples of the present disclosure.

Disclosed are various examples for configuring user accounts across multiple directory services, such as across a hybrid MICROSOFT ACTIVE DIRECTORY® (AD) and MICROSOFT AZURE ACTIVE DIRECTORY® (AAD) directory service. When a user account successfully logs into a directory service, the directory service can transmit an identifier corresponding to the user account and the credentials to a management service providing MDM or EMM capabilities. The management service can require information from multiple directory services in order to determine proper permissions for the user account. However, the identifier transmitted by the directory service might not identify the user account within other directory services. This problem is amplified when the management service requires data from another directory service to determine properties and permissions for the user account, but the management service cannot properly identify the user account when querying the other directory service using the identifier transmitted by the first directory service.

A directory service can be deployed in an on-premises or in a remotely deployed environment. More than one directory service can be deployed and synchronized together. For example, an enterprise environment can have a legacy MICROSOFT ACTIVE DIRECTORY® (AD) service deployed on-premises and make use of a directory service that is deployed remotely and potentially managed by a third party other than the enterprise served by the directory service. Synchronization between the on-premises and remotely deployed directory services can be a one-way or two-way synchronization. For example, an on-premises directory service can push changes to a remotely deployed directory service, or both directory services can synchronize changes to their respective directories with one another.

A remotely deployed directory service can manage the authentication, verification, and registration process for a client device. The remotely deployed directory service can receive credentials for a user account from a client device and authenticate the credentials against the credentials stored in the remotely deployed directory service. Further, the remotely deployed directory service can verify that the user account associated with the received credentials has permissions to join the network with the client device. The remotely deployed directory service can also register a client device with the remotely deployed directory service by storing client device information associated with the user account in a data store.

The remotely deployed directory service can be configured to call an EMM service, such as a management service, when credentials for a user account are successfully authenticated. The EMM service can be called to manage the permissions and properties for the client device. The call can include data about the client device when a client device is successfully authenticated. For example, the management service can receive an object ID and a User Principal Name (UPN) when a client device joins the remotely deployed directory service. The management service can query the legacy directory service for information stored in the legacy directory service. To query the legacy directory service, the management service must include an identifier that is known by the legacy directory service.

With reference to FIG. 1, shown is an example of a networked environment 100 according to various examples. The networked environment 100 includes a computing environment 103, a remotely deployed directory service 106, a locally deployed directory service 109, and client device(s) 112, which are in data communication with each other over a network 115. The network 115 includes, for example, the Internet, intranets, extranets, wide area networks (WANs), local area networks (LANs), wired networks, wireless networks, or other suitable networks, or any combination of two or more networks. For example, networks can include satellite networks, cable networks, Ethernet networks, and other types of networks.

The computing environment 103 can include a data store 118 and a management service 121. The management service 121 can manage and oversee the operation of client device(s) 112. That is, the management service 121 can determine whether a user, a device, or a pairing of a user and a device are authorized to access a company resource, such as a printer or network storage, based on access rights. The access rights can be compliance rules that can be determined at the time of the access request. That is, a condition, such as a state of the client device 112, can be evaluated to determine whether access is authorized.

The management service 121 can also facilitate enrollment of a client device 112 on behalf of a user account. In one example, an employer can operate the management service 121 to ensure that the client devices 112 of its employees operate in compliance with the security policies. In another example, an employer can configure the management service 121 to enforce different policies (or no policies at all) based upon which users or employees are currently logged into or otherwise operating the client device 112. The management service 121 can also facilitate access to email, calendar data, contact information, and other resources provided by the computing environment 103 or accessible on the client device 112.

The remotely deployed directory service 106 and the locally deployed directory service 109 can store, organize, and provide access to information in a hierarchical manner by mapping names to values. In some instances, the remotely deployed directory service 106 and locally deployed directory service 109 can organize information by domain (e.g. "example.com," "company.com," or "us.company.com"). For example, the remotely deployed directory service 106 and the locally deployed directory service 109 can store information regarding user accounts and computing devices associated with a domain corresponding to the remotely deployed directory service 106 and the locally deployed directory service 109, such as all user accounts and computers registered to access resources within the "example.com" domain. In some instances, the remotely deployed directory service 106 and the locally deployed directory service 109 can provide additional functionality, such as authenticating logins for user accounts within a domain, applying policies to user accounts within a domain (e.g. password requirements, limiting access to files and applications) or to computing devices linked to a domain (e.g. mandating that certain applications be installed on a computing device or that certain software be installed to a computing device when a particular user is logged in).

The data store 118 in the computing environment 103 can include a list of managed users 124 and user properties 127. The data store 130 in the remotely deployed directory service 106 can include data such as users 133 and groups 136. Further, the data store 142 in the locally deployed directory service 109 can also include data such as users 145 and groups 148.

The list of managed users 124 can represent those users, user accounts, or client device(s) 112 that are managed by the management service 121. The list of managed users 124 can include or correspond to various users 133 and users 145 stored in the remotely deployed directory service 106 or the locally deployed directory service 109.

The managed users 124 and user properties 127 can include information regarding the client devices 112, such as client devices 112 previously accessed by a managed user 124, that are managed and controlled by the management service 121. User properties 127 for a particular managed user 124 can include, for example, device information regarding each client device 112 assigned to the managed user 124. The device information for a client device 112 can include the identification of applications that are installed in the client device 112, historical data regarding the operation of the client device 112, and other information. The device information can also include a set of compliance rules that can be specified by the management service 121. As an example, the management service 121 can assign various compliance rules to a managed user 124, a client device 112 associated with a managed user 124, or a pairing of the managed user 124 and a client device 112.

The compliance rules can specify conditions that must be satisfied for a managed user 124 to be deemed compliant with the compliance rule. In one example, a compliance rule can specify that particular applications are prohibited from being installed by on a client device 112. In another example, a compliance rule can specify that a lock screen is required to be generated when the client device 112 is "awoken" from a low power (e.g., "sleep") state and that a passcode is required for a user to unlock the lock screen. Additionally, some compliance rules can be based on time, hardware configuration, software configuration, geographical location, network properties, or other predefined conditions.

A client device 112 can satisfy a compliance rule when a client device 112 is located within a particular geographic location. In one example, a client device 112 can satisfy a compliance rule when the client device 112 is in communication with a particular network 115, such as a particular local area network that is managed by the computing environment 103. Furthermore, a compliance rule in another example can be satisfied upon the time and date matching specified values. A compliance rule can require a client device 112 to be within the particular geographic location or proximity to another client device 112 for a preconfigured duration.

Another example of a compliance rule involves whether a managed user 124 belongs to a particular group of authorized users. A compliance rule can include a whitelist or a blacklist that specifies whether particular managed user 124 or groups of managed user 124 are authorized users. In various examples, the computing environment 103, the client device 112, or a combination of both the computing environment 103 and the client device 112 can determine whether a client device 112 satisfies a compliance rule.

In some examples, a company can operate the management service 121 to ensure that the client devices 112 of its managed users 124 satisfy respective compliance rules. By ensuring that the client devices 112 of the company's managed users 124 are operating in compliance with the compliance rules, the company can control access to resources to thereby improve the security of client devices 112 associated with the company and managed users 124.

The user properties 127 can include attributes associated with the managed users 124. The user properties 127 can include permissions for a managed user 124 and permissions for groups to which the managed user 124 belongs, such as attributes associated with groups and permissions granted or denied for groups. The user properties 127 can include compliance rules assigned to a managed user 124 or a group that the managed user 124 is assigned. The management service 121 can determine appropriate permissions for a managed user 124 using the user properties 127. For example, the management service 121 can grant any permissions or properties to a managed user 124 that are assigned or granted to groups of which the managed user 124 is a member. Further, the management service 121 can ensure compliance with all compliance rules prior to granting permissions to a managed user 124.

The users 133 contain information about user accounts within the remotely deployed directory service 106 and the users 145 contain information about user accounts within the locally deployed directory service 109. The users 133 and 145 can include user credentials, properties, and an object ID for a user account within the directory services. The groups 136 contain information about groups within the remotely deployed directory service 106 and the groups 148 contain information about groups within the locally deployed directory service 109. The groups 136 and 148 include group assignments for user accounts. Groups 136 and 148 can also include other information about user groups, such as group properties. According to some examples, some or all of the users 133 in the remotely deployed directory service 106 and the users 145 in the locally deployed directory service 109 are synced in real-time or according to a sync schedule.

Groups 136 and 148 can represent logical groupings of users 133 and 145 to facilitate management of users 133 and 145. For example, users 133 or 145 who are in a sales department can be included in a "Sales" group in either groups 136 or groups 148. Policies applied to the "Sales" group 136 can then automatically be applied to each of the users 133 or 145 who is a member of the "Sales" group 136. In some instances groups 136 or 148 can be members of other groups 136 or 148. For example, an "All Sales" group 136 can include among its members an "East Coast Sales" group 136 that include all sales employees east of the Mississippi river and a "West Coast Sales" group 136 that include all sales employees west of the Mississippi river. Policies and settings applied to the "All Sales" group 136 could then be applied to the members of the "East Coast Sales" group 136 and the "West Coast Sales" group 136, which in turn would be applied to each user 133 in each of the groups 136.

Further, an "All Sales" group 136 can correspond to an "All Sales" group 148, and properties of the two groups are synced on an interval to ensure all users belonging to either group have the same properties and permissions. For example, each user 133 assigned to "East Coast Sales" group 136 inherits the group properties of both the "All Sales" group 136 and the "All Sales" group 148. Each group 136 and 148 managed by remotely deployed directory service 106 and the locally deployed directory service 109 can also include individual users 133 and 145 or groups 136 and 148 managed by other directory services. For example, a group 148 managed by the locally deployed directory service 109 can include individual users 133 or groups 136 managed by the remotely deployed directory service 106.

In some examples, part of the data stored in users 133 and groups 136 and the data stored in users 145 and groups 148 is the same or is duplicated. The duplicated data can be stored in different formats or structures within the respective data stores 130 and 142. Data can be synchronized between the remotely deployed directory service 106 and the locally deployed directory service 109. For example, the locally deployed directory service 109 can be scheduled to push changes to the remotely deployed directory service 106 daily. In one example, the data is pulled. For example, the remotely deployed directory service 106 is scheduled to query the locally deployed directory service 109 for changes and apply the changes to data store 130. The changes can be transferred between remotely deployed directory service 106 and the locally deployed directory service 109 in real-time as changes to the data occur. The synchronization can include a mapping of data to convert from one format or structure to another format of structure. According to one example, the locally deployed directory service 109 pushes user selected data variables to the remotely deployed directory service 106 on a schedule.

The management service 121 can utilize the remotely deployed directory service 106 or locally deployed directory service 109 to provide management services. According to some examples, an administrator can add and remove user accounts to or from the data store 130 or 142. The administrator can include group assignments for the user account and a variety of permissions for the user account. The management service 121 can query the remotely deployed directory service 106 or the locally deployed directory service 109 for data stored in data store 130 or 142. In some examples, the query is performed when the remotely deployed directory service 106 or the locally deployed directory service 109 indicates a client device 112 has joined the network. In other examples, the management service 121 queries the remotely deployed directory service 106 and the locally deployed directory service 109 on an interval to generated and update user properties 127.

According to one example, a client device 112 connects to the management service 121 and provides authentication credentials, for example, Azure authentication credentials. The management service 121 transmits the authentication credentials to the remotely deployed directory service 106. The remotely deployed directory service 106 can call the management service 121 with the object ID and the UPN for the corresponding user account. In another example, the client device 112 can call the management service 121 with the device information. The client device 112 can include the device information in a header of an HTTP request including the object ID and the UPN after authenticating with the remotely deployed directory service 106 or the locally deployed directory service 109. According to another example, the remotely deployed directory service 106 or the locally deployed directory service 109 can direct the client device to call the management service 121 if the remotely deployed directory service 106 or the locally deployed directory service 109 has been configured to use the management service 121 as an MDM.

The management service 121 can check a list of managed users 124 for the user account, for example, by searching for the object ID. If a corresponding user account, a corresponding client device 112, or a pairing of the user account with the client device 112 is not listed in the list of managed users 124, the management service 121 can add the user account, the client device 112, or the pairing of the user account with the client device 112 to the list of managed users 124. In one example, the management service 121 can add the user account without user assistance. In another example, the management service 121 can require administrator approval before adding the user account. The management service 121 can query the remotely deployed directory service 106 to determine a globally unique identifier, as discussed herein, and query the remotely deployed directory service 106 and the locally deployed directory service 109 for properties associated with the user account.

To facilitate enrollment, the management service 121 can process the data received from the remotely deployed directory service 106 and the locally deployed directory service 109 to generate properties for the user account and store the properties in user properties 127. A management record associated with a client device 112 can be populated with permissions based on data received and stored in the user properties 127. Thereafter, the management service 121 can configure the client device 112 to adhere to the permissions stored in user properties 127. For example, the client device 112 can be configured to access a particular network file if the user properties 127 specify that the user account of the client device 112 is authorized to access the particular network file.

Figure 2:
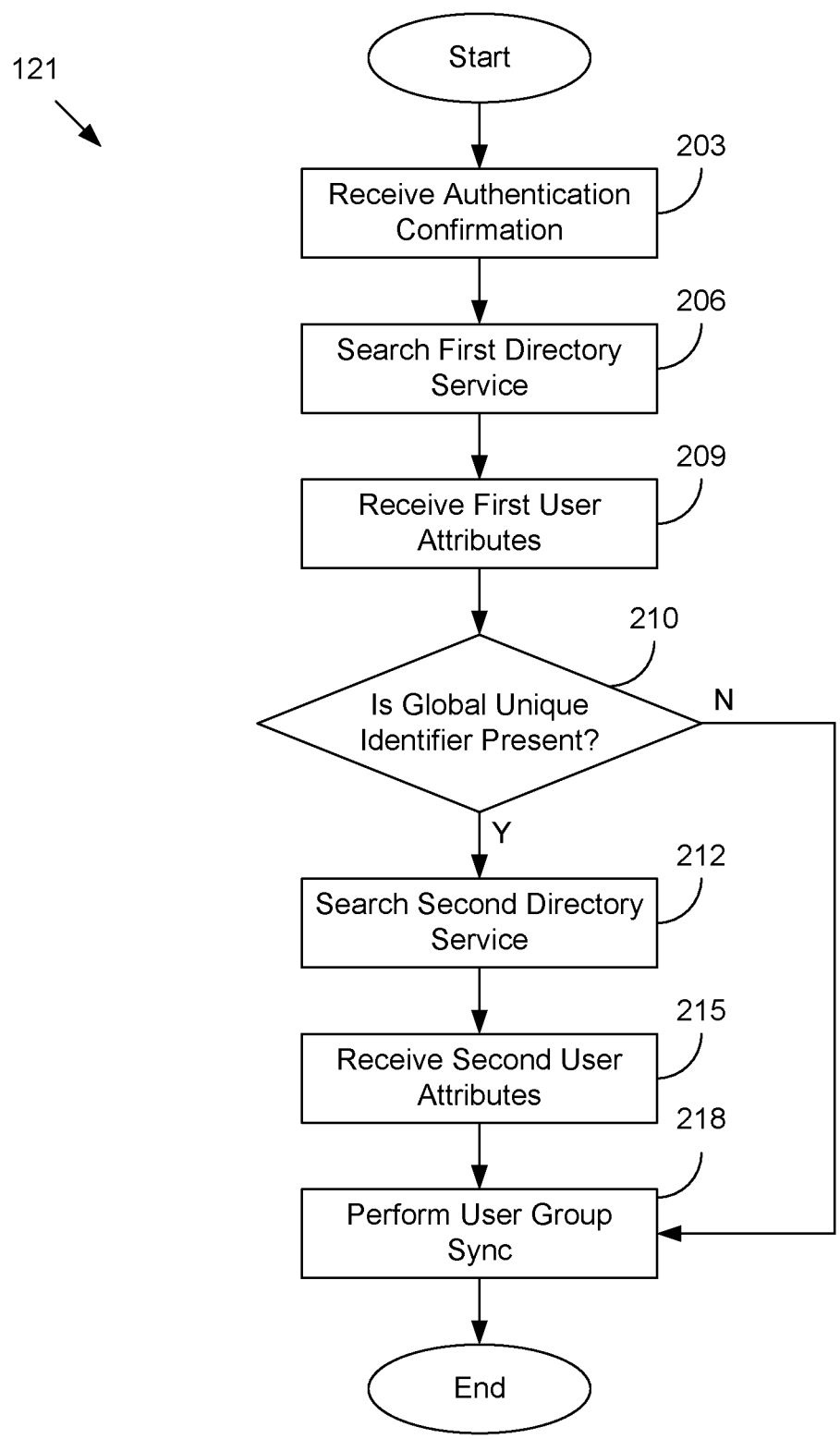
FIGS. 2-4 are flowcharts illustrating examples of functionality implemented as portions of applications in the networked environment of FIG. 1 according to various examples of the present disclosure.

Referring next to FIG. 2, shown is a flowchart that provides one example of the operation of a portion of the management service 121. As an alternative, the flowchart of FIG. 2 can be viewed as depicting an example of elements of a method implemented in the computing environment 103. FIG. 2 illustrates an example of how the management service 121 can determine properties and permissions for a user account on a client device 112 by determining a shared unique identifier from a first directory service and querying the directory services using the shared unique identifier to obtain the properties and permissions of the user account. According to one example, the shared unique identifier is referred to as an immutable ID.

Beginning with step 203, the management service 121 receives an authentication confirmation. For example, a user can provide authentication credentials to a client device 112 to initiate logging into the remotely deployed directory service 106. The remotely deployed directory service 106 can authenticate the credentials. The remotely deployed directory service 106 can authenticate the authentication credentials against a corresponding user record in users 133 and provide an authentication confirmation to the management service 121. The remotely deployed directory service 106 can generate a UPN from the authentication credentials, look up an object ID in users 133, and include the UPN and object ID in the authentication confirmation provided to the management service 121. The remotely deployed directory service 106 can provide the client device 112 with an access token once authenticated. The client device 112 can provide the access token to the management service 121 to verify authentication.

According to one example, the client device 112 provides the authentication credentials to the management service 121, and the management service 121 authenticates the credentials. In another example, the management service 121 receives the authentication credentials and authenticates the authentication credentials with the remotely deployed directory service 106. Once authenticated, the management service 121 transmits the authentication credentials to the remotely deployed directory service 106 and the remotely deployed directory service 106 returns the UPN and the object ID.

The management service 121 can authenticate a user's access to a resource such as a network, email, applications, or any other enterprise resource. As an example, the management service 121 can determine if a user account is granted access to a resource based on user properties 127 that correspond to the managed user 124 associated with the user account. As another example, the management service 121 can authenticate whether a particular user account is granted access to a resource based on data received from the remotely deployed directory service 106 and the locally deployed directory service 109. The remotely deployed directory service 106 can be configured to call the management service 121 when the user is authenticated. For example, during configuration of the remotely deployed directory service 106, an administrator can configure the directory service with an address of the management service 121 to call the management service 121 when the user is authenticated. The management service 121 can receive the authentication confirmation including a UPN and an object ID.

In another example, the management service 121 receives an authentication credential from the client device 112. In this example, the management service 121 authenticates the authentication credential with the remotely deployed directory service 106 and the management service 121 receives the authentication confirmation including a UPN and an object ID in return from the remotely deployed directory service 106. The object ID is a unique identifier for the user account that is generated by the remotely deployed directory service 106. According to one example, the management service 121 can search the list of managed users 124 and the user properties 127 for any information stored in the data store 118 corresponding to the user account. If no entries are found associated with the user account, a new entry can be created by the management service 121 and stored in managed users 124 and user properties 127.

According to one example, when a new entry is created, the management service 121 generates a new managed user entry including the immutable ID, object ID, and UPN. The management service 121 stores the managed user entry in the list of managed users 124. The management service 121 can determine permissions and attributes for the user account based in part on data queried from the remotely deployed directory service 106 and the locally deployed directory service 109. The management service 121 can store the group memberships, permissions, and attributes in user properties 127. For example, the management service 121 can determine a user account in users 133 belongs to a "Sales" group 148, has permissions to access the application Office 365 from Microsoft, has permissions to access a system resource, and has an attribute for expiration of the account set for Jul. 1, 2017. The management service 121 can store these determined group memberships, permissions, and attributes within the user properties 127.

At step 206, the management service 121 searches a first directory service for an immutable ID of a user account. The management service 121 submits a search query to the remotely deployed directory service 106 including the object ID presented when the user was authenticated. The management service 121 can also submit a request for an immutable ID shared by both the remotely deployed directory service 106 and the locally deployed directory service 109. In some examples, the management service 121 submits the search query by transmitting a remote procedure call to the remotely deployed directory service 106. As one example, the management service 121 can query the remotely deployed directory service 106 with the object ID requesting an immutable ID that corresponds to a user account. In one example, the immutable ID is a base 64 encoded object GUID attribute of the user. The immutable ID is unique for a given user account to both the remotely deployed directory service 106 and the locally deployed directory service 109, such as an AAD and an on-premises AD respectively.

At step 209, the management service 121 receives the requested attributes from the remotely deployed directory service 106. For example, the remotely deployed directory service 106 can search users 133 for the object ID and return an immutable ID and other attributes associated with the user account.

At step 210, the management service 121 determines whether the returned attributes include the shared unique identifier. If the shared unique identifier is not present, then the management service 121 proceeds to step 218. The shared unique identifier can be omitted from the attributes returned by the remotely deployed directory service 106 if the user account is not present in the locally deployed directory service 109. Otherwise, if the shared unique identifier is present, the management service 121 proceeds to step 212.

At step 212, the management service 121 searches a second directory service for attributes of a user account. The management service 121 can submit a request for attributes from the locally deployed directory service 109. The request includes the shared unique identifier received from the remotely deployed directory service 106. As an example, the management service 121 can query the on-premises AD server with the immutable ID requesting user and group attributes associated with the user account of the client device 112. At step 215, the management service 121 receives the attributes from the locally deployed directory service 109. For example, the locally deployed directory service 109 can search users 145 for the shared unique identifier and return attributes associated with the user account.

At step 218, the management service 121 performs a data sync. For example, the management service 121 updates the list of managed users 124 and the user properties 127 based in part on the attributes obtained from the remotely deployed directory service 106 and the locally deployed directory service 109. According to one example, the management service 121 performs a data sync for any user accounts in the list of managed users 124 on a schedule, such as a daily, hourly, or according to any other schedule. The management service 121 can perform the data sync by periodically querying the remotely deployed directory service 106 and the locally deployed directory service 109. As another example, the management service 121 can continuously sync data. During a scheduled sync, the management service 121 can iterate through the list of managed users 124 for the stored immutable ID and object ID for each user account. The management service 121 can query the remotely deployed directory service 106 and the locally deployed directory service 109 for various attributes and permissions associated with the user account, as described herein in steps 206 and 209, and 212 and 215, respectively.

According to one example, the management service 121 is configured to perform a scheduled sync to avoid costly resource utilization and delay when synchronizing data in real-time for a user upon each login. However, using a scheduled syncing can result in stale user properties 127. As an example, before performing a scheduled sync, a system administrator grants access for a resource to a user account, but upon login, the user account does not have access until a scheduled sync is performed. In another example, the management service 121 can perform a real-time sync to ensure any recent changes in permissions for a user account in either the remotely deployed directory service 106 or the locally deployed directory service 109 are reflected in the user properties 127.

However, the user might have to wait while the sync occurs upon logging in. As an example, when system resources are heavily utilized, a user might wait for the sync to complete for seconds or tens of seconds when logging in. In this example, any recently granted access to a resource by a system administrator is available upon login. According to one example, a hybrid model allows for a scheduled synchronization to occur periodically and for a real-time update if changes are detected for a user account since the last periodic sync.

The management service 121 can generate and store updated user properties 127 for each user account. According to another example, data can be synced upon user account login when no record exists for the user account in managed users 124. In this example, data can be synced on a schedule or continuously for any existing user accounts in the list of managed users 124. When the locally deployed directory service 109 returns attributes including group assignments for a user and the directory service 106 returns attributes including specific permissions for the user account not found in the locally deployed directory service 109, the corresponding user properties 127 entry can include both the group assignments and the specific permissions for the user account after a data sync.

If the shared unique identifier was found in step 210, the shared unique identifier can be stored in the list of managed users 124 associated with the user account for future synchronizations. If the list of managed users 124 does not contain a record for the user account, the management service 121 can add the user account to the list of managed users 124 and generate the user properties 127 using the received attributes. In one example, the added user account can include data only present in one of the remotely deployed directory service 106 or locally deployed directory service 109. According to one example, all properties and attributes are stored in locally deployed directory service 109 but the remotely deployed directory service 106 manages features only available using a remotely deployed directory service 106. For example, an AAD can be configured to handle registration of new WINDOWS 10 devices, but all permissions and attributes for a user account are stored in an on-premises AD.

When the management service 121 detects a conflict for a data element stored in both data store 130 and data store 142, the management service 121 can be configured to resolve the conflict by one of a variety of methods. For example, the management service 121 can be configured to automatically resolve a conflict by using the data from remotely deployed directory service 106. In another example, the management service 121 can be configured to automatically use the data from the locally deployed directory service 109 as the most recent. In another example, the management service 121 can prompt or message an administrative user to resolve the conflict. In yet another example, the management service 121 can be configured to compare corresponding timestamps for the data elements and resolve the conflict by using the most recent version of each data element, such as the data element with the most recent last saved timestamp, last created timestamp, last modified timestamp, or last accessed timestamp.

According to one example, when the shared unique identifier is omitted from step 209, the management service 121 queries only the remote deployed directory service 106 for attributes. Otherwise, the management service 121 queries the remotely deployed directory service 106 for attributes exclusive to the remotely deployed directory service 106 and the management services 121 queries the locally deployed directory service 109 for any shared attributes or any other attributes exclusive to the locally deployed directory service 109. The remotely deployed directory service 106 can include application specific permissions not available or included in the locally deployed directory service 109.

The remotely deployed directory service 106 can support application specific features that might not be supported by the locally deployed directory service 109. For example, the remotely deployed directory service 106 can include the ability for a system administrator to grant permissions for user accounts to online software packages that might not be available for a locally deployed directory service 109. In an example configuration where permissions and attributes are stored in the locally deployed directory service 109, the remotely deployed directory service 106 can include a limited set of permissions and attributes that are exclusively available on the remotely deployed directory service 106.

The management service 121 can transmit a request to set properties in the remotely deployed directory service 106 and the locally deployed directory service 109. For example, an administrator can move a user to a new group stored in the groups 148 using the management service 121. The management service 121 can push changes to the groups 148 in the locally deployed directory service 109. As another example, the administrator can add access for user 133 to a resource using the management service 121. The management service 121 can push the changes to the user 133 in the remotely deployed directory service 106. The management service can push changes by calling an API, transmitting a remote procedure call, or transmitting a message.

Figure 3:
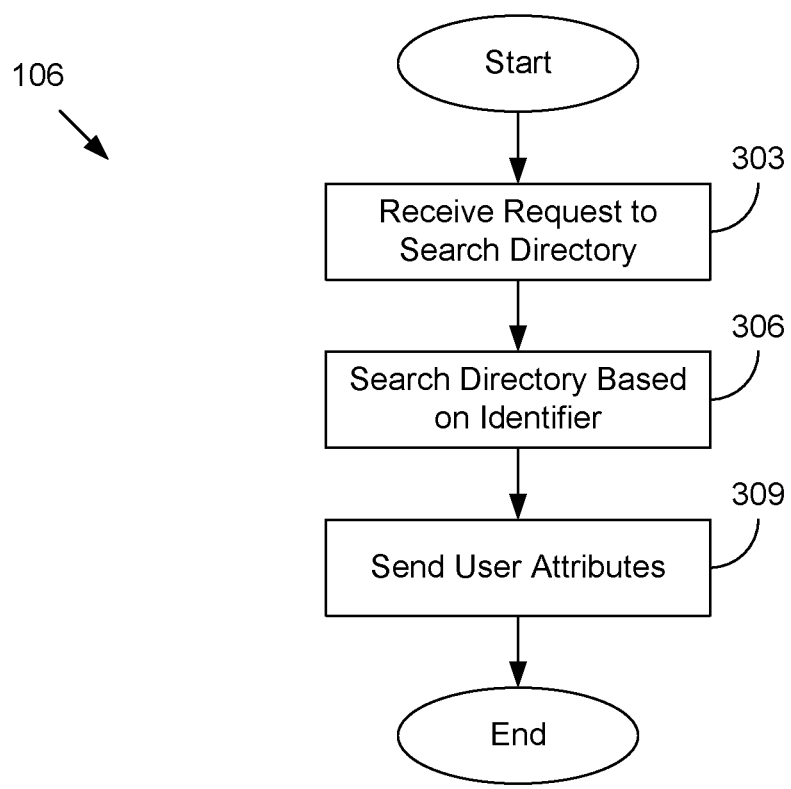

Referring next to FIG. 3, shown is a flowchart that provides one example of the operation of a portion of the remotely deployed directory service 106. As an alternative, the flowchart of FIG. 3 can be viewed as depicting an example of elements of a method implemented in a remotely deployed directory service 106. FIG. 3 illustrates an example of how a remotely deployed directory service 106 can receive search requests and respond with properties and permissions of the user account.

Beginning with step 303, the remotely deployed directory service 106 receives a search request from the management service 121 to search based on an identifier, such as an object ID. The identifier can correspond to an identifier provided by the remotely deployed directory service 106 in an authentication confirmation. In one example, the search request can be a request for all data associated with the object ID. In another example, the search request can include an identification of specific fields that the management service 121 is requesting. The management service 121 can include a request for an immutable ID in the search request. The remotely deployed directory service 106 can determine which specific fields the management service 121 is requesting based on the search request.

At step 306, remotely deployed directory service 106 queries the directory for information associated with the identifier. For example, the remotely deployed directory service 106 can search users 133 for the object ID. The remotely deployed directory service 106 can retrieve a user 133 that corresponds to the object ID. The remotely deployed directory service 106 can also retrieve any groups 136 that the user 133 is a member. As an example, the remotely deployed directory service 106 can retrieve information about the user 133 and any groups 136 that the user 133 is a member, such as properties and compliance rules. In another example, when the management service 121 submits a search request for an immutable ID, the remotely deployed directory service 106 can retrieve the immutable ID from the user 133 that corresponds to the object ID. The remotely deployed directory service 106 can also return other attributes associated with the user 133.

At 309, the remotely deployed directory service 106 sends data associated with the search request. As an example, the remotely deployed directory service 106 can send information about a user 133 to the management service 121 where the user 133 corresponds to the identifier. Information sent by the remotely deployed directory service 106 can include specific fields requested by the management service 121. For example, when the management service 121 submits a search request for an immutable ID, the remotely deployed directory service 106 can send the immutable ID for a user 133 that corresponds to the identifier.

Figure 4:
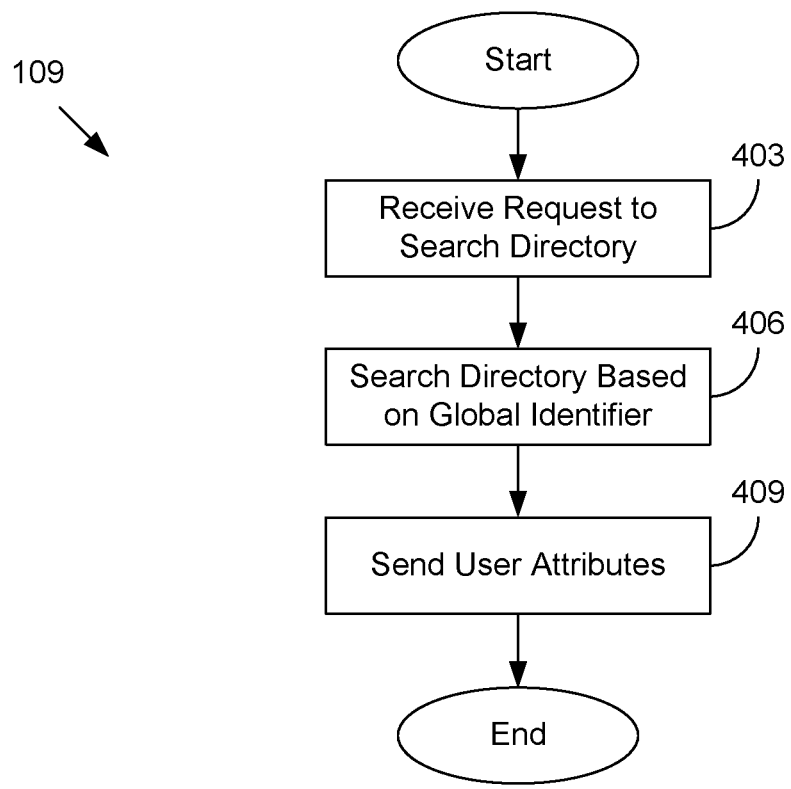

Referring next to FIG. 4, shown is a flowchart that provides one example of the operation of a portion of the locally deployed directory service 109. As an alternative, the flowchart of FIG. 4 can be viewed as depicting an example of elements of a method implemented in the locally deployed directory service 109. FIG. 4 illustrates an example of how a locally deployed directory service 109 can receive search requests with a global identifier and respond with properties and permissions of the user account.

Beginning with step 403, the locally deployed directory service 109 receives a request from the management service 121 to search the directory based on a global identifier. The global identifier can correspond to an identifier provided by the remotely deployed directory service 106, for example, an attribute sent in step 309. In one example, the search request can be a request for all data associated with the global identifier. In another example, the search request can include an identification of specific fields that the management service 121 is requesting. The locally deployed directory service 109 can determine which specific fields the management service 121 is requesting based on the search request.

At step 406, locally deployed directory service 109 queries the directory for information associated with the global identifier. For example, the locally deployed directory service 109 can search users 145 for the global identifier. The locally deployed directory service 109 can retrieve a user 145 that corresponds to the global identifier. The locally deployed directory service 109 can also retrieve any groups 148 of which the user 145 is a member. As an example, the locally deployed directory service 109 can retrieve information about the user 145 and any groups 148 that the user 145 is a member, such as properties and compliance rules. The locally deployed directory service 109 can return attributes associated with the user 133.

At 409, the locally deployed directory service 109 sends the user attributes to the management service 121. As an example, the locally deployed directory service 109 can send information about a user 145 to the management service 121 where the user 145 corresponds to the global identifier. Information sent by the locally deployed directory service 109 can include specific fields requested by the management service 121. For example, when the management service 121 submits a search request for a specific field, the locally deployed directory service 109 can send the specified field for the user 145 that corresponds to the global identifier.

The flowcharts of FIGS. 2-4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, or troubleshooting aid. It is understood that all such variations are within the scope of the present disclosure.

The computing environment 103, the remotely deployed directory service 106, the locally deployed directory service 109, the client devices 112, and other components described herein can each include at least one processing circuit. Such a processing circuit can include one or more processors and one or more storage devices that are coupled to a local interface. The local interface can include a data bus with an accompanying address/control bus or any other suitable bus structure.

The one or more storage devices for a processing circuit can store data and components that are executable by the one or processors of the processing circuit. The management service 121 and other components can be stored in one or more storage devices and be executable by one or more processors. Also, a data store, such as the data stores 118, 130, and 142 can be stored in the one or more storage devices.

The management service 121 and other components described herein can be embodied in the form of hardware, as software components that are executable by hardware or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. Such a computer-readable medium can contain, store, and maintain the software or program instructions for use by or in connection with the instruction execution system.

The computer-readable medium can include physical media, such as, magnetic, optical, semiconductor, and other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A method, comprising:
in an instance in which a user account comprising an identifier is detected as omitted from a list of managed users managed by a management service, searching a first directory service for a plurality of first user attributes based at least in part on the identifier;
receiving the plurality of first user attributes from the first directory service;
determining that the plurality of first user attributes includes a global identifier;
searching a second directory service for a plurality of second user attributes based at least in part on the global identifier;
receiving the plurality of second user attributes from the second directory service; and
enrolling a client device in the management service, the management service configured to enforce at least one compliance rule based on the user account being assigned to a group based on one of the plurality of second user attributes.

2. The method of claim 1, further comprising receiving an authentication confirmation comprising the identifier from the client device, the client device being associated with the user account.

3. The method of claim 2, further comprising updating a plurality of user properties corresponding to the user account based at least in part on at least one of: the plurality of first user attributes or the plurality of second user attributes.

4. The method of claim 3, further comprising scheduling a periodic query of the first directory service and the second directory service for changes to the user account, wherein updating the plurality of user properties corresponding to the user account occurs in response to the periodic query.

5. The method of claim 1, wherein the global identifier is an immutable identifier.

6. The method of claim 1, further comprising:
detecting a conflict between the plurality of first user attributes and the plurality of second user attributes; and
resolving the conflict based at least in part on a last modified timestamp associated with a conflicting set of user attributes.

7. A non-transitory computer-readable medium embodying a program that, when executed by at least one computing device, causes the at least one computing device to at least:
in an instance in which a user account comprising an identifier is detected as omitted from a list of managed users managed by a management service, search a first directory service for a plurality of first user attributes based at least in part on the identifier;
receive the plurality of first user attributes from the first directory service;
determine that the plurality of first user attributes includes a global identifier;
searching a second directory service for a plurality of second user attributes based at least in part on the global identifier;
receive the plurality of second user attributes from the second directory service; and
enroll a client device in the management service, the management service configured to enforce at least one compliance rule based on the user account being assigned to a group based on one of the plurality of second user attributes.

8. The non-transitory computer-readable medium of claim 7, wherein the program further causes the at least one computing device to at least receive an authentication confirmation comprising the identifier from the client device, the client device being associated with the user account.

9. The non-transitory computer-readable medium of claim 8, wherein the program further causes the at least one computing device to at least update a plurality of user properties corresponding to the user account based at least in part on at least one of: the plurality of first user attributes or the plurality of second user attributes.

10. The non-transitory computer-readable medium of claim 9, wherein the program further causes the at least one computing device to at least schedule a periodic query of the first directory service and the second directory service for changes to the user account, wherein updating the plurality of user properties corresponding to the user account occurs in response to the periodic query.

11. The non-transitory computer-readable medium of claim 7, wherein the global identifier is an immutable identifier.

12. The non-transitory computer-readable medium of claim 8, wherein the program further causes the at least one computing device to at least:
detect a conflict between the plurality of first user attributes and the plurality of second user attributes; and
resolve the conflict based at least in part on a last modified timestamp associated with a conflicting set of user attributes.

13. A system, comprising:
a data store;
at least one computing device in communication with the data store, the at least one computing device being configured to at least:
in an instance in which a user account comprising an identifier is detected as omitted from a list of managed users managed by a management service, search a first directory service for a plurality of first user attributes based at least in part on the identifier;
receive the plurality of first user attributes from the first directory service;
determine that the plurality of first user attributes includes a global identifier;
search a second directory service for a plurality of second user attributes based at least in part on the global identifier;
receive the plurality of second user attributes from the second directory service; and
enroll a client device in the management service, the management service configured to enforce at least one compliance rule based on the user account being assigned to a group based on one of the plurality of second user attributes.

14. The system of claim 13, wherein the at least one computing device is further configured to at least receive an authentication confirmation comprising the identifier from the client device, the client device being associated with the user account.

15. The system of claim 14, wherein the at least one computing device is further configured to at least update a plurality of user properties corresponding to the user account based at least in part on at least one of: the plurality of first user attributes or the plurality of second user attributes.

16. The system of claim 15, wherein the at least one computing device is further configured to at least schedule a periodic query of the first directory service and the second directory service for changes to the user account, wherein updating the plurality of user properties corresponding to the user account occurs in response to the periodic query.

17. The system of claim 13, wherein the global identifier is an immutable identifier.

18. The method of claim 1, wherein the identifier comprises at least one of: an object ID and a User Principal Name.

19. The non-transitory computer-readable medium of claim 7, wherein the identifier comprises at least one of: an object ID and a User Principal Name.

20. The system of claim 13, wherein the identifier comprises at least one of: an object ID and a User Principal Name.

* * * * *